(12) United States Patent
Lefaux et al.

(10) Patent No.: US 11,980,934 B2
(45) Date of Patent: May 14, 2024

(54) METHOD FOR MANUFACTURING A TURBINE ENGINE VANE

(71) Applicants: SAFRAN, Paris (FR); SAFRAN AERO BOOSTERS, Herstal (BE)

(72) Inventors: Yann Jean-Pierre Lefaux, Herstal (BE); Pierre Jean Sallot, Moissy-Cramayel (FR)

(73) Assignees: SAFRAN, Paris (FR); SAFRAN AERO BOOSTERS, Herstal (BE)

( * ) Notice: Subject to any disclaimer, the term of this patent is extended or adjusted under 35 U.S.C. 154(b) by 0 days.

(21) Appl. No.: 18/250,796

(22) PCT Filed: Oct. 25, 2021

(86) PCT No.: PCT/EP2021/079459
§ 371 (c)(1),
(2) Date: Apr. 27, 2023

(87) PCT Pub. No.: WO2022/090115
PCT Pub. Date: May 5, 2022

(65) Prior Publication Data
US 2023/0405668 A1  Dec. 21, 2023

(30) Foreign Application Priority Data

Oct. 27, 2020 (EP) ..................................... 20306288

(51) Int. Cl.
*B22D 19/14* (2006.01)
*B22D 19/02* (2006.01)
(Continued)

(52) U.S. Cl.
CPC .............. *B22D 19/04* (2013.01); *B22D 19/02* (2013.01); *B22D 19/14* (2013.01); *B33Y 80/00* (2014.12);
(Continued)

(58) Field of Classification Search
CPC ................................ B22D 19/02; B22D 19/14
See application file for complete search history.

(56) References Cited

U.S. PATENT DOCUMENTS 3,844,727 A * 10/1974 Copley .................. B22D 19/02
428/614

FOREIGN PATENT DOCUMENTS

| EP | 2 843 193 A1 | 3/2015 |
| FR | 3 081 370 A1 | 11/2019 |
| WO | 97/33009 A1 | 9/1997 |

OTHER PUBLICATIONS

International Search Report mailed Feb. 1, 2022, issued in corresponding International Application No. PCT/EP2021/079459, filed Oct. 25, 2021, 5 pages.
(Continued)

*Primary Examiner* — Kevin E Yoon
(74) *Attorney, Agent, or Firm* — CHRISTENSEN O'CONNOR JOHNSON KINDNESS PLLC

(57) ABSTRACT

A method for manufacturing a turbine engine vane a root connected to a blade extending in a longitudinal direction includes the steps of providing a root; and providing mold with a first cavity and a second cavity that together define a recess in which the vane is formed. The recess includes a first space in which the blade is formed and a second space in which the root is formed. The method further includes the steps of providing aluminum strips; positioning a fibrous reinforcement; arranging the vane root in the second space; and injecting a foam comprising aluminum or injecting an aluminum alloy into the first space of the recess of the mold such that the foam impregnates the fibrous reinforcement.

13 Claims, 2 Drawing Sheets

(51) Int. Cl.
*B22D 19/04* (2006.01)
*B33Y 80/00* (2015.01)
*C22C 47/06* (2006.01)
*C22C 47/08* (2006.01)
*C22C 49/06* (2006.01)
*D03D 1/00* (2006.01)
*D03D 15/242* (2021.01)
*F01D 5/30* (2006.01)

(52) U.S. Cl.
CPC .............. *C22C 47/06* (2013.01); *C22C 47/08* (2013.01); *C22C 49/06* (2013.01); *D03D 1/00* (2013.01); *D03D 15/242* (2021.01); *D10B 2101/08* (2013.01); *D10B 2505/02* (2013.01); *F01D 5/30* (2013.01); *F05D 2230/314* (2013.01); *F05D 2300/603* (2013.01)

(56) References Cited

OTHER PUBLICATIONS

Written Opinion mailed Feb. 1, 2022, issued in corresponding International Application No. PCT/EP2021/079459, filed Oct. 25, 2021, 5 pages.

\* cited by examiner

METHOD FOR MANUFACTURING A TURBINE ENGINE VANE

TECHNICAL FIELD OF THE INVENTION

The present document relates to a method for manufacturing a vane for a turbine engine including a root made of a titanium-based alloy connected to an aluminium-based radial blade.

PRIOR ART

A new turbine engine architecture is looked for to meet the aviation needs. This new architecture requires the implementation of compressors capable of withstanding high rotational speeds. This architecture change induces additional or new constraints, which should be considered in the manufacture of compressor rotor and stator vanes.

Among these, the mass of the rotating bladings is particularly challenging. Conventionally, it is known to manufacture vanes comprising a root and a blade, the vanes being made of titanium in order to ensure some mechanical strength to the assembly. However, bladings made of titanium alloy impose significant centrifugal forces, in particular on the disc carrying said vanes, making research for new low-density materials necessary.

Using alloys such as aluminium in order to reduce the density of the blade is not without consequence. Indeed, such a vane configuration including aluminium is subject to mechanical, thermal and environmental resistance stresses. Henceforth, it is impossible to use standard aluminium alloys since they would not feature adequate structural hardening.

It is known from the patent WO2019211583 to make parts where an envelope is made of a long fibre/metal composite with a foam core. This part type is manufactured using a liquid metal injection step and a moulding process allowing obtaining a "net-shape" part. Nevertheless, this process has not been applied to blades.

Furthermore, said patent does not address the problem of a blade whose root includes a titanium alloy and the blade comprises a base made of another alloy whose density is more favourable to a mass reduction. The assembly of two distinct alloys in one blade faces a specific problem during production.

In such a context, other problems arise. Thus, phenomena of erosion by particles ingested at the air inlet are even more significant as the pursued rotational speed is high. Furthermore, it is also necessary to look for strength such that the blade could withstand the ingestion of large-sized objects such as birds. Finally, in such speed conditions, increased risks of ice accretion are also noticed.

As regards ice accretion, the easiest way to avoid this problem is to make the surface of the considered material hydrophobic. Hence, most existing solutions consist in depositing at the surface of the vanes a coating which ensures this function. Nevertheless, the erosion induced by ingested particles might degrade these coatings and their ability to make the surface hydrophobic.

PRESENTATION OF THE INVENTION

The present document relates to a method for manufacturing a vane for a turbine engine including a root connected to a blade extending according to a longitudinal direction, the method comprising the steps of:

a) providing a root made of a titanium-based alloy, the root being intended to be assembled on a disc, said root being preferably made by additive manufacturing;

b) providing a mould comprising a first cavity and a second cavity together defining a recess in which the blade is intended to be formed, said recess comprising a first space intended to form the blade and a second space intended to form the root, c) providing aluminium strips including a coating comprising at least one of the hydrophobic and anti-erosion functions and placing them in contact:
  with the first cavity in the first space of the recess, and/or
  with the second cavity in the first space of the recess;

d) placing a fibrous reinforcement in the first space of the recess and/or in the second space of the recess and at least partially in contact with the aluminium strips;

e) arranging said vane root in the second space of the recess of said mould;

f) injecting a compound comprising aluminium into the first space of the recess of the mould so that the compound impregnates the fibrous reinforcement.

The fibrous reinforcement enables the surface to withstand the different modes of vibration, fatigue stress, but also to confer the necessary mechanical properties on the blade. This fibrous reinforcement also brakes the propagation of potential cracks, allowing for a better tolerance to damage to parts and therefore good durability and high reliability of the product. The fibre content should also allow maintaining some ductility necessary to withstand the ingestion of external objects such as birds.

The use of this fibrous reinforcement will allow both mechanical strength of the blading but also will allow withstanding the erosion induced by the ingestion of external particles.

Furthermore, the enhanced electrical resistivity properties of the aluminium used in the compound and the formed fibrous reinforcement can enable defrosting by passage of an electric current and heating by Joule effect.

In step c), carbon nanotubes may be placed, preferably by chemical vapour deposition, over an outer face of said aluminium strips and said carbon nanotubes comprising free ends facing either the first cavity in the first space of the recess or the second cavity in the first space of the recess.

Carbon nanotubes have a very hydrophobic nature which allows limiting ice accretion phenomena. Furthermore, these carbon nanotubes harden the face carrying said aluminium strips, which also contributes to protection against erosion.

Said aluminium strips may be held in the mould by gluing.

Upon injection of the compound including aluminium, the glue holding the aluminium strips is destroyed, which makes the bonding method very operational and non restrictive.

The fibrous reinforcement may comprise a woven structure comprising an arrangement of weft yarns and warp yarns, the warp yarns extending according to the longitudinal direction and the weft yarns extending according to a transverse direction, perpendicular to the longitudinal direction.

The warp yarns may have a longitudinal dimension comprised between 10 and 100% of the longitudinal dimension of the blade to be manufactured and the weft yarns may have a transverse dimension comprised between 10 and 100% of the transverse dimension of the blade to be manufactured.

This fibrous reinforcement allows reinforcement in the longitudinal and transverse direction of the surface of the vane. These long fibres allow making the mechanical behaviour of the material more isotropic once injected.

Said fibrous reinforcement may have a ratio between the number of weft yarns and the number of warp fibres comprised between 0 and 0.5.

Said fibrous reinforcement may be shaped so as to present at the surface grooves perpendicular to the longitudinal axis defined between the weft yarns, the width of these grooves being comprised between 10 and 150 µm.

This feature of the fibrous reinforcement allows conferring a hydrophobic function on the surface of the blade.

The grooves perpendicular to the longitudinal axis may be such that an h/s ratio is comprised between 0.1 and 0.6 with h denoting an average amplitude of the grooves perpendicular to the longitudinal axis in µm and s denoting a spatial period of the grooves perpendicular to the longitudinal axis in µm.

An arithmetic mean roughness parameter of a profile of the surface of the blade Ra may be comprised between 10 and 200 µm.

This optimisation of the arithmetic mean roughness parameter of the profile of the surface of the blade Ra forms a method for obtaining a hydrophobicity of the surface of the blade and a lower sensitivity to erosion. This method is even more suitable as the roughnesses to be reached are high. The roughness thus reached allows improving the aerodynamic performances of the surface and obtaining a texture suitable for the separation of boundary layers.

Said compound may be an aluminium foam.

The low density of the foam allows reducing the mass of the blade and having enhanced electrical resistivity properties.

Said compound may comprise an aluminium alloy.

DETAILED DESCRIPTION OF THE INVENTION

The present document relates to a vane comprising a root 1 made of a titanium-based alloy compatible with the materials used for a disc carrying said vane roots. This compatibility allows considering a direct assembly between the vane and the disc (or the shroud) by friction welding for example. Said blade further includes a blade comprising an aluminium alloy.

Figure 1:
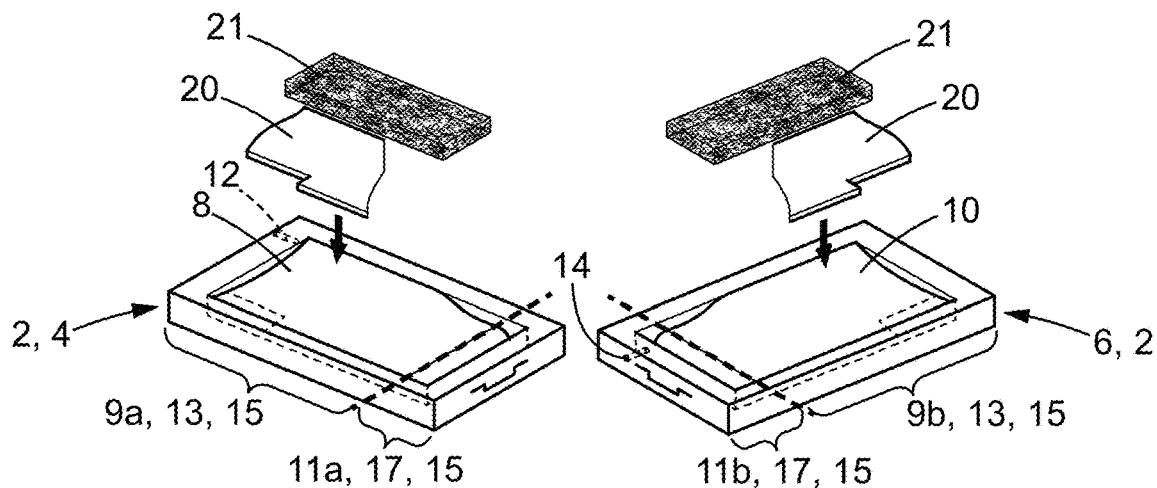
FIG. 1 is a schematic representation of a mould and of steps b) to d) of a method according to the invention.

As illustrated in FIG. 1, a mould 2 is used in order to manufacture such a vane. In fine, said vane to be manufactured matches with the geometry of the mould 2. The mould 2 comprises at least a first shell 4 and a second shell 6 which arranged against one another form said mould 2. The first shell 4 includes a first inner face forming a first cavity 8. The second shell 6 includes a second inner face forming a second cavity 10. When the first shell 4 and the second shell 6 are assembled against one another, the first cavity 8 and the second cavity 10 together form a recess in which the vane is intended to be formed.

Each of the first cavity 8 and the second cavity 10 comprises a first area 9a, 9b and a second area 11a, 11b. The first area 9a of the first cavity 8 delimits with a first area 9b of the second cavity 10 a first space 13 of the recess 15 which is intended to form the blade. The second area 11a of the first cavity 8 delimits with the second area 11b of the second cavity 10 a second space 17 of the recess 15 which is intended to form the root 1. The first space 13 of the recess 15 and the second space 17 of the recess 15 together form the inner recess of the mould 2 intended to form the vane as indicated before.

The first shell 4 includes a first inner channel 12, a first end of which opens at the first space 13 of the recess 15 and a second end of which opens outside said mould 2. The second shell 6 includes a second inner channel 14, a first end of which opens at the second space 17 of the recess 15 and a second end of which opens outside said mould 2.

The first space 13 of the recess 15 delimits a space into which is injected what is intended to form the blade. Furthermore, the second space 17 of the recess 15 is able to receive in particular the root of the vane, preferably manufactured by additive manufacturing.

Figure 4:
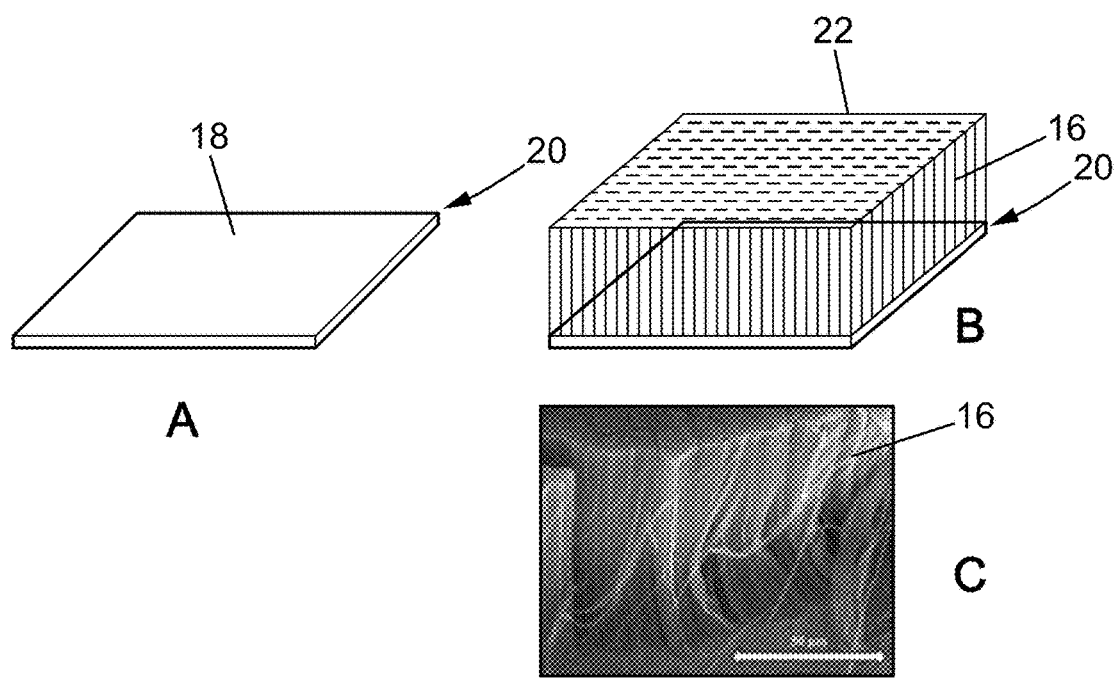
FIG. 4A is a schematic representation of an aluminium strip according to the invention.
FIG. 4B is a schematic representation of an aluminium strip functionalised with carbon nanotubes according to the invention.
FIG. 4C is an image obtained by microscopy of a deposit of carbon nanotubes according to the invention.

According to the present document, a metal strip 20 with a low density comprised between 2 and 5 is used, preferably made of aluminium. This metal strip 20 comprises an inner face and an outer face. This metal strip 20 may be a strip made of titanium. The outer face of the aluminium strip includes a coating able to create a hydrophobicity and/or anti-erosion function. As illustrated in FIG. 4, carbon nanotubes 16 may also be deposited, preferably by chemical vapour deposition, also known by the acronym CVD standing for "Chemical Vapour Deposition" over this outer face 18 of the aluminium strip 20. Said carbon nanotubes 16 are oriented perpendicular to said outer face 18 of the aluminium strip 20. The carbon nanotube 16 deposit thickness is comprised between 20 and 500 µm.

However, other coatings may also be considered. These other coatings have the characteristic of not having phases likely to be melted in an interval comprised between 600 and 700° C. in order not to contaminate the aluminium or form embrittling phases with the aluminium.

Figure 2:
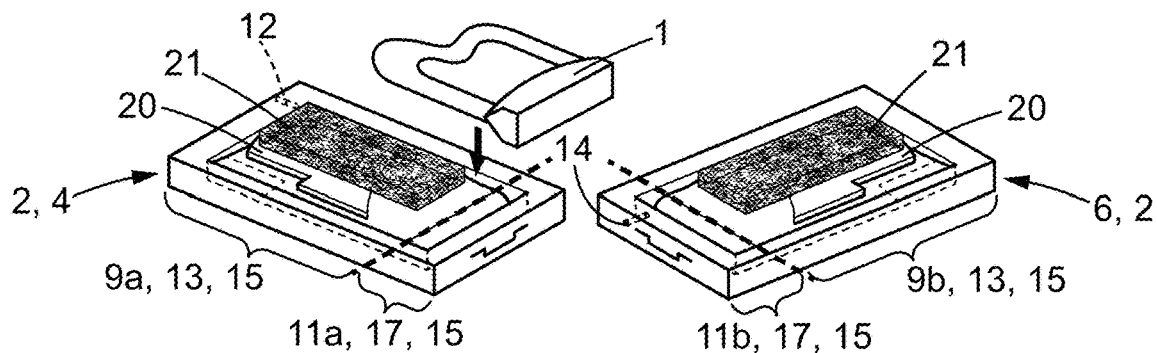
FIG. 2 is a schematic representation of a mould and of step e) of a method according to the invention.

As illustrated in FIG. 2, the aluminium strips 20 thus functionalised by the coating(s) are then cut to the desired size to be positioned in the mould. Part of the aluminium strips are positioned against the first area 9a of the first cavity 8 and/or aluminium strips are positioned against the first area 9b of the second cavity 10 delimiting the recess 15. The aluminium strips 20 are held in position by gluing. During a functionalisation of the aluminium strips by carbon nanotubes, these carbon nanotubes comprise free ends, i.e. ends not bonded to the aluminium strips on a side opposite to the ends bonded to the aluminium strips 20, facing the first area 9a of the first cavity 8 or the first area 9b of the second cavity 10.

As illustrated in FIGS. 1 and 2, a fibrous reinforcement 21 is placed in the first space 13 of the recess 15 of the mould 2 and at least partially in contact with the aluminium strips 20. The fibrous reinforcement 21 could also be entirely in contact with the aluminium strips 20.

In a particular embodiment, only the fibrous reinforcement 21 is placed in the first space 13 of the recess 15 of the mould 2.

Preferably, this fibrous reinforcement 21 includes a two-dimensional or three-dimensional fabric comprising warp yarns and weft yarns. The warp yarns extend according to the longitudinal direction and the weft yarns according to a transverse direction perpendicular to the longitudinal direction.

The weft yarns and the warp yarns comprising aluminium include a first end attached to the first area 9a of the first cavity 8 and a second end holding the fibrous reinforcement 21 placed in the first space 13 of the recess 15. Similarly, weft and warp yarns comprising aluminium include a first end attached to the first area 9b of the second cavity 10 and a second end holding the fibrous reinforcement 21 placed in the first space 13 of the recess 15.

The weft yarns and the warp yarns include a length which is imposed by the size of the part. The warp yarns oriented according to the longitudinal direction have a longitudinal dimension comprised between 10 and 100% of the longitudinal dimension of the blade to be manufactured. The weft yarns oriented transversely to the longitudinal direction have a transverse dimension comprised between 10 and 100% of the transverse dimension of the blade to be manufactured. The volume ratio of weft and warp yarns is the same in all of the areas comprising this fibrous reinforcement 21. Thus, this fabric provides reinforcement in the longitudinal and transverse direction of the surface of the vane.

As regards the orientation of the weft yarns and the warp yarns, the warp yarns are predominate even though the weft yarns are also present in the transverse direction perpendicular to the longitudinal direction in order to reduce the anisotropy. A ratio defined by a ratio between the number of weft yarns and the number of warp yarns is comprised between 0 and 0.5.

In a particular embodiment, the fibres are preferably made of alumina.

To confer a hydrophobic function on the surface of the blade, a particular pattern is made by the fabric of the fibrous reinforcement 21. This is the pattern between the warp yarns and the weft yarns that allows adapting the surface roughness to the needs, but also making the latter customisable according to the stressed areas on the blading. This pattern of the fabric of the fibrous reinforcement 21 is such that an arithmetic mean roughness parameter of a profile of the surface of the blade called Ra is comprised between 10 and 200 µm. This allows achieving the hydrophobicity function of the surface of the blade.

Figure 5:
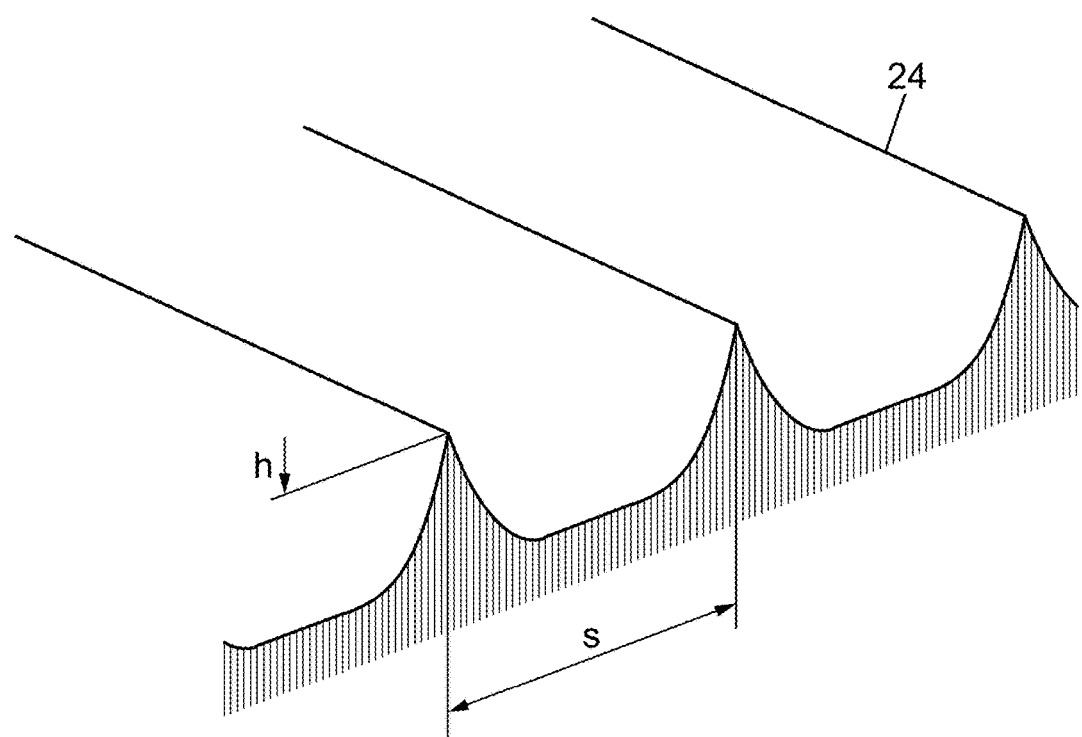
FIG. 5 is a schematic representation of the grooves perpendicular to the longitudinal axis according to the invention.

To reach such a value of Ra, the arrangement of the weft yarns and of the warp yarns is optimised. This optimisation takes into account the diameter of the yarns. Thus, as illustrated in FIG. 5, said fibrous reinforcement 21 is shaped so as to have at the surface grooves perpendicular to the longitudinal axis 24 called riblets defined between the weft yarns. These grooves perpendicular to the longitudinal axis comprise a width comprised between 10 and 150 µm, with an h/s ratio comprised between 0.1 and 0.6 where h denotes an average amplitude of the grooves perpendicular to the longitudinal axis and s denotes a spatial period of the grooves perpendicular to the longitudinal axis.

The surface roughness of the blade may also be printed at the surface of the blade by modifying the first area 9a of the first cavity 8 and/or the first area 9b of the second cavity 10 may also be optimised by using, for example, a laser so as to obtain a fine roughness parameter Ra comprised between 500 nm and 100 µm. It is also possible to directly generate the desired parameter Ra at the surface of the blade once unmoulded. This optimisation of the first areas 9a, 9b of the first 8 and of the second cavity forms a second method in order to obtain hydrophobicity of the surface of the blade. This second method will be even more suitable as the roughnesses to be reached are high. The roughness thus reached allows improving the aerodynamic performances of the surface and obtaining a texture suitable for the separation of boundary layers.

Thus, this fibrous reinforcement 21 enables the surface to withstand the different modes of vibration, fatigue stress. This fibrous reinforcement 21 also brakes the propagation of potential cracks, allowing for a better tolerance to damage to the parts and therefore for good durability and high reliability of the product. The fibre content should also allow maintaining some ductility necessary to withstand the ingestion of external objects such as birds.

The use of fibres made of alumina allows obtaining neutrality with liquid aluminium.

The use of this fibrous reinforcement 21 will allow both the mechanical strength of the blading but also will allow resisting the erosion induced by the ingestion of external particles.

Figure 3:
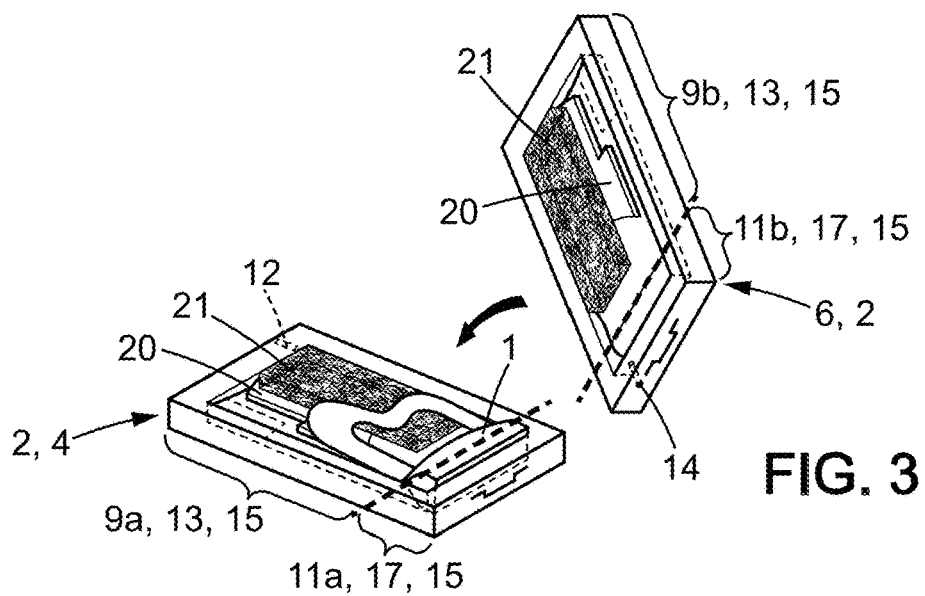
FIG. 3 is a schematic representation of a mould and of the continuation of step e) of a method according to the invention.

Afterwards, as illustrated in FIGS. 2 and 3, the root 1 is placed in the second space 17 of the recess 15 of the mould 2 and held in this second space 17 of the recess thanks to a housing which exactly matches with the geometry of the root 1. Then, the first cavity 8 and the second cavity 10 of the mould are set against one another so as to close the mould.

The first inner channel 12 of the first cavity 8 of the mould allows bringing the liquid aluminium while the second inner channel 14 of the second cavity 10 is able to draw vacuum into the mould. When injecting a foam including aluminium, the glue holding the aluminium strips is destroyed. The aluminium is injected at the centre of the first space 13 of the recess 15 between the fibrous reinforcement located against the first area 9a of the first cavity 8 and the fibrous reinforcement located against the first area 9b of the second cavity 10. This allows pressing the fibrous reinforcement respectively against the first cavity 8 and the second cavity 10 of the mould 2. The yarns enabling holding of the fibrous reinforcement disappear upon injection by merging with the injected aluminium. Thus, the blade includes a core made of an aluminium-based foam to reach low densities. The electrical conduction properties of aluminium can allow defrosting by passage of an electric current and heating by Joule effect. Alternatively to this aluminium-based foam, the blade may include a core comprising an aluminium alloy which may comprise nano-reinforcements, for example of the silicon carbide SiC or alumina type.

As regards the functionalisation of the surface of the blade by carbon nanotubes 16, specific interactions occur during the injection of liquid aluminium. Indeed, during the deposition of carbon nanotubes 16 over the outer face 18 of the aluminium strip the carbon nanotubes 16 are connected only at their end with the aluminium. These carbon nanotubes 16 are often composed of several mono-atomic carbon sheets rolled up around each other. When the liquid aluminium infiltrates the base of the carbon nanotubes 16, the first sheets of the carbon nanotube 16 interact with the aluminium, the carbon of the sheets diffuses into the aluminium. This interdiffusion gives rise to carbides, like $Al_4C_3$, which thus surround the base of the carbon nanotubes 16. This corresponds to a metallurgical anchoring of the nanotubes in the aluminium matrix, which allows assembling them individually with the surface made of aluminium.

These carbides also harden the underlying surface, which also contributes to protection against erosion.

The invention claimed is:

1. A method for manufacturing a vane for a turbine engine including a root connected to a blade extending according to a longitudinal direction, the method comprising the steps of:
   a) providing a root made of a titanium-based alloy, the root being configured to be assembled on a disc;
   b) providing a mold comprising a first cavity and a second cavity together defining a recess in which the blade is formed, said recess comprising a first space in which the blade is formed and a second space in which the root is formed,
   c) providing aluminum strips including a coating comprising at least one of the hydrophobic and anti-erosion functions and placing them in contact:
   with the first cavity in the first space of the recess, and/or
   with the second cavity in the first space of the recess;
   d) placing a fibrous reinforcement in the first space of the recess and/or in the second space of the recess and at least partially in contact with the aluminum strips;
   e) arranging said root in the second space of the recess of said mold; and
   f) injecting a compound comprising aluminum into the first space of the recess of the mold so that the compound impregnates the fibrous reinforcement.

2. The method according to claim 1, wherein, in step c), carbon nanotubes are placed over an outer face of said aluminum strips and said carbon nanotubes comprising free ends facing either the first cavity in the first space of the recess or the second cavity in the first space of the recess.

3. The method according to claim 2, in step c), the carbon nanotubes are placed by chemical vapor deposition.

4. The method according to claim 1, wherein said aluminum strips are held in the mold by gluing.

5. The method according to claim 1, wherein the fibrous reinforcement comprises a woven structure comprising an arrangement of weft yarns and warp yarns, the warp yarns extending according to a longitudinal direction and the weft yarns extending according to a transverse direction, perpendicular to the longitudinal direction.

6. The method according to claim 5, wherein the warp yarns have a longitudinal dimension comprised between 10% and 100% of a longitudinal dimension of the blade to be manufactured and the weft yarns have a transverse dimension comprised between 10% and 100% of a transverse dimension of the blade to be manufactured.

7. The method according to claim 5, wherein said fibrous reinforcement has a ratio between the number of weft yarns and the number of warp fibers comprised between 0 and 0.5.

8. The method according to claim 7, wherein an arithmetic mean roughness parameter of a profile of a surface of the blade Ra is comprised between 10 µm and 200 µm.

9. The method according to claim 5, wherein said fibrous reinforcement is shaped so as to present at surface grooves perpendicular to a longitudinal axis defined between the weft yarns, the width of the grooves being comprised between 10 µm and 150 µm.

10. The method according to claim 9, wherein the grooves perpendicular to the longitudinal axis are such that an h/s ratio is comprised between 0.1 and 0.6 with h denoting an average amplitude of the grooves perpendicular to the longitudinal axis in µm and s denoting a spatial period of the grooves perpendicular to the longitudinal axis in µm.

11. The method according to claim 1, wherein said compound is an aluminum foam.

12. The method according to claim 1, wherein said compound comprises an aluminum alloy.

13. The method according to claim 1, wherein the root is made by additive manufacturing.

* * * * *